United States Patent Office 3,459,518
Patented Aug. 5, 1969

3,459,518
SULFONYL SUBSTITUTED TERPOLYMER
FUEL DETERGENTS
Enver Mehmedbasich, El Cerrito, Calif., assignor to
Chevron Research Company, San Francisco, Calif.,
a corporation of Delaware
No Drawing. Filed Dec. 22, 1966, Ser. No. 603,787
Int. Cl. C10l 1/24
U.S. Cl. 44—63    4 Claims

ABSTRACT OF THE DISCLOSURE

Terpolymer compositions of relatively low molecular weight having aliphatic 1-olefins of from about 8 to 30 carbon atoms, N-substituted maleimides and olefins having a sulfone interrupted chain. The compositions find use as detergents in fuels.

BACKGROUND OF THE INVENTION

Field of the invention

Fuels are susceptible to chemical reaction on aging. The effect of oxidation is to produce soluble and insoluble materials of higher molecular weight and boiling point than the original fuel. The deterioration due to oxidation and the like of distillate fuels, particularly in diesel fuel, manifests itself, for example, through the appearance of color and gums. The tacky oxidized fuel deposits adhere readily to injector parts and can cause injector sticking, nozzle hole plugging and leakage past critical surfaces.

Also, diesel engines are equipped with fuel filters to remove particulate matter from the fuel. Any gums which are present in the fuel tend to coat onto the filter requiring frequent changes of the filter in order to permit adequate fuel flow as well as effective filtering action.

While many materials might effectively act as commercially successful dispersants for the gum, the field is severely limited to relatively few materials. For, since the dispersant is an additive to the fuel, it must not significantly increase the deposits created in the combustion chamber, which interfere with the proper functioning of the piston. In order to have an acceptable fuel dispersant, it is not only necessary that the dispersant maintain the gums dispersed in the fuel mixture, but the dispersant itself, when introduced into the combustion chamber should not form deposits which significantly interfere with the operation of the piston.

Description of the prior art

Recently, novel fuel detergents were disclosed in application Ser. No. 554,994, filed on June 3, 1966, now Patent No. 3,413,104, a continuation-in-part of application Ser. No. 417,470, filed Dec. 10, 1964, now abandoned. These polymers were relatively low molecular weight alternating copolymers of aliphatic 1-olefins of from about 8 to 30 carbon atoms and N-substituted maleimides, where the substituent on the nitrogen had an amine nitrogen.

SUMMARY OF THE INVENTION

Pursuant to this invention, terpolymers are provided having from about 15 to 30 mole percent of a 1-olefin of from 5 to 12 carbon atoms and 0 to 1 ethereal oxygen (interrupting the carbon chain), having a sulfonyl group bonded to a carbon at least β to the olefinic carbon; correspondingly, from 35 to 20 mole percent of an aliphatic 1-olefin of from 8 to 30 carbon atoms and about 50 mole percent of an N-substituted maleimide. The substituents on the nitrogen of the maleimide may be the same or different and are organic radicals composed solely of carbon, hydrogen and nitrogen, having a total of from 3 to 60 carbon atoms and from 0 to 5 amine nitrogen atoms.

The substituents on the succinimide nitrogen can be aminoalkyl, polyalkylene amine or the mono-N- or di-N,N-aliphatic hydrocarbyl substituted derivatives thereof. (By the term "aliphatic hydrocarbyl" is intended organic radicals free of aromatic unsaturation composed solely of carbon and hydrogen. The radical may be aliphatically saturated or unsaturated, i.e., olefinic and acetylenic.

The molecular weight of the molecule will generally be in the range of about 2,000 to 15,000, more usually in the range of about 4,000 to 10,000.

DESCRIPTION OF PREFERRED EMBODIMENTS

For the most part, the sulfonyl substituted olefin will have the following formula:

wherein $m$ is an integer of from 0 to 1, $n$ is an integer of from 1 to 2, and Y is a sulfonyl interrupted carbon chain of from 2 to 8 carbon atoms, the total number of the carbon atoms of the olefin being from about 5 to 12.

Y may be heterocyclic having as its only heteroatom the sulfur of the sulfonyl group or may be an aliphatic chain; that is, an aliphatic chain interrupted by the sulfonyl group, which may be straight or branched chain, generally free of aliphatic unsaturation, e.g., ethylenic and acetylenic. When Y is heterocyclic, it will generally form a ring of from 5 to 6 annular members.

When Y is an aliphatic group, Y will have the formula

wherein A is an alkylene radical of from 1 to 7 carbon atoms, B is an aliphatic radical, usually alkyl, of from 1 to 7 carbon atoms and the sum of the number of carbon atoms of A and B is in the range of 2 to 8.

When Y is heterocyclic, the radical will have the following formula

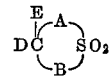

wherein D is a bond or alkylene of from 1 to 2 carbon atoms, E is hydrogen or methyl, A and B are either a bond or alkylene, at least one of A and B being alkylene, the total number of annular carbon atoms being 4 or 5 (including the carbon atom to which A and B are bonded), and the sum total of carbon atoms of A, B, D and E being in the range of 3 to 7.

Usually, when Y is heterocyclic the sulfur containing olefin will have the following formula

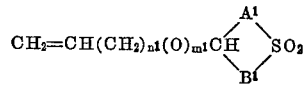

wherein $n^1$ is an integer of from 1 to 2, $m^1$ is an integer of from 0 to 1, $A^1$ and $B^1$ are a bond or alkylene, at least one of $A^1$ and $B^1$ being alkylene, the total number of annular carbon atoms being in the range of 4 to 5 and the sum of the carbon atoms of $A^1$ and $B^1$ being in the range of 3 to 7. The annular carbon atoms may be substituted with lower alkyl groups of from 1 to 3 carbon atoms, e.g., methyl, ethyl, etc.

The polymers of this invention will have as their repeating unit a group of the following structure:

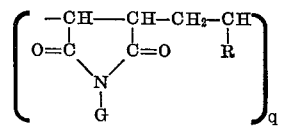

wherein $q$ is an integer of from about 4 to 20, and G is an organic radical of from about 3 to 60 carbon atoms, more usually of from 3 to 30 carbon atoms, having from 0 to 5 amine nitrogens, more usually from 0 to 1 amine nitrogens. G is free of aromatic unsaturation and may or may not have aliphatic unsaturation, e.g., ethylenic. Usually sites of unsaturation will be in the range of about 0 to 2. The symbol G includes aminoalkyl, polyalkylene amine, N-hydrocarbyl aminoalkyl, N-hydrocarbyl polyalkylene amine and N,N-dihydrocarbyl aminoalkyl, wherein the hydrocarbyl groups are free of aromatic unsaturation, usually being aliphatic hydrocarbyl.

R is 15 to 35 mole percent of a radical of the following formula:

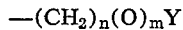

wherein the symbols are as defined previously and correspondingly, 85 to 65 mole percent of an alkyl radical of from 6 to 28 carbon atoms.

The preferred subgenus within the scope of the invention has a repeating unit of the following formula:

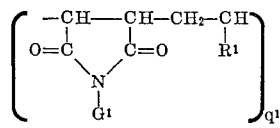

wherein $q^1$ is an integer of from 4 to 20, more usually of from 6 to 16, $R^1$ is defined in the same manner as R, and $G^1$ is an aliphatic radical of from 8 to 24 carbon atoms, wherein the carbon chain is interrupted by from 0 to 1 amino nitrogens. The nitrogen may be primary, secondary or tertiary, but will usually be secondary. Also, the nitrogen will usually be separated from the nitrogen of the imide group by from about 2 to 4 carbon atoms.

The remaining two valences of the polymer will be satisfied in a variety of ways. One or both of the valences may be satisfied by a radical derived from the polymer initiator or the polymeric chain may terminate by transfer, coupling or disproportionation, resulting in alkyl groups, alkenyl groups, succinimidyl or maleyl groups.

Individual monomers will now be considered. Illustrative monomers having the sulfonyl functionality are allyl 3-sulfolanyl ether, 3-butenyl 3-sulfolanyl ether, allyl 1,1-dioxo-4-thiapyranyl ether, 3-vinylsulfolane, 3-(1-butenyl) ethyl sulfone, allyl octyl sulfone, 3-(1-butenyl) hexyl sulfone, etc.

Illustrative radicals substituted on the nitrogen of the succinimide (G) are aminohexyl,
aminooctadecyl,
N-hexylaminohexyl,
N,N-diethylaminobutyl,
N-octyl-3-aminopropyl,
N-decyl-2-aminoethyl,
N-dodecyl-2-aminoethyl,
N-hexadecenyl-2-aminoethyl,
N-ocetadecenyl-3-aminopropyl,
N-eicosenyl-3-aminopropyl,
N-eicosyl-2-aminoethyl,
N-octadecyl-3-aminopropyl, etc.

The olefins which are used in the preparation of the copolymer and which provide the R radicals include decene, dodecene, tetradecene, docosene, tetracosene, tetrapropylene, tetraisobutylene, etc. The olefins may be straight chain or branched chain, being usually straight chain. That is, the R radical will also be straight chain or branched chain, being preferably straight chain.

Preferably, a mixture of olefins will be used rather than a single olefin. When using mixed olefins, superior fuel solubility is obtained. The mixture will generally have not more than 50% of any single olefin and preferably not more than 30 mole percent of any single olefin in the range of olefins used, usually the number of olefins in the mixture being from about 3 to 10 olefins.

The compounds of this invention are readily prepared by copolymerizing a mixture of aliphatic 1-monoolefins and 1-olefins having a sulfonyl group interrupting the carbon chain (optionally having an ethereal oxygen present in the chain) in the desired proportions with maleic anhydride by means of free radical catalysts and then combining the resulting polymer with the desired amine at elevated temperatures to form the alternating N-substituted polysuccinimide.

The sulfonyl substituted olefin may be treated for the purposes of the polymerization as if it were an aliphatic 1-monoolefin and reference may be had to procedures in the art for the copolymerization of aliphatic 1-olefins with maleic anhydride. See, for example, U.S. Patent No. 3,051,562.

The free radical catalyst may be any organic compound which at a temperature in the range of 50° to 100° C. decomposes to form free radicals which may then initiate the polymeric chain, although temperatures outside this range may be used advantageously under some conditions. The most popular organic free radical agents are the peroxidic initiators—hydroperoxide, dihydrocarbyl peroxide, and diacyl peroxide—and azo compounds. Illustrative of hydroperoxide catalysts are cumyl hydroperoxide, pinene hydroperoxide, tert.-butyl hydroperoxide, p-methane hydroperoxide, etc. Illustrative of dihydrocarbyl peroxides are dicumyl peroxide, ascaridole, di(tert.-butyl) peroxide, etc. Illustrative of diacyl peroxides are benzoyl peroxide, lauroyl peroxide, acetyl peroxide, 2,4-dichlorobenzoyl peroxide, etc.

In carrying out the various polymerizations, inert hydrocarbons or halohydrocarbons may be used as solvents to advantage. Illustrative of such solvents are benzene, toluene, chlorobenzene, etc.

Usually, the solvent will be from 20 to 80 weight percent of the total reaction mixture, more usually about 30 to 70 weight percent.

The mole ratio of 1-olefin (both sulfonyl containing an aliphatic hydrocarbon) to maleic anhydride will generally be about 0.9–1.2:1.2–0.9, more usually about 1:1. The ratio of maleic anhydride to catalyst will generally be 1:0.005–0.1 mole ratio, more usually 1:0.01–0.1 mole ratio.

As already indicated, the temperatures will depend upon the catalyst. Temperatures in the range of 50° to 100° C. may be used; more usually the temperature will be in the range of about 75° to 95° C. The time for the reaction will depend on the catalyst used, the amount of material, and the other variables. Generally, at least one hour will be required, and usually the reaction will not be carried out for more than a period of 24 hours.

Depending on the amount of the materials, the catalyst may be added in a single addition or in aliquot portions during the course of the reaction, maintaining a relatively constant concentration of free radicals in the reaction mixture.

The reaction of the copolymer with the relevant amine is readily carried out by combining the copolymer with the amine in an inert hydrocarbon solvent at elevated temperatures (50°–150° C.) and removing the water as formed. Preferably, an aromatic hydrocarbon solvent is used which allows for azeotroping the water. When the stoichiometric amount of water has been obtained, the reaction is stopped.

The following examples are offered by way of illustration and not by way of limitation.

Example A.—Into a reaction flask fitted with a stirrer, condenser and thermometer was introduced 4.4 g. (0.025 mole) of allyl 3-sulfolanyl ether, 9.8 g. (0.01 mole) of maleic anhydride and 18.72 g. (0.075 mole) of cracked wax 1-monoolefin in the range of 15 to 20 carbon atoms and 64.8 g. of benzene. The mixture was heated while stirring to a temperature of 140° F. and 1 g. (0.004 mole) of benzoyl peroxide and a minimum of benzene added. The solution was then heated at 185° F. and maintained for 12 hours under a nitrogen atmosphere. The polymer was then isolated.

*Analysis.*—S, 2.45%; 2.49%.

Example I.—Into a reaction flask was introduced 129.7 g. (0.1 mole) of a solution of the terpolymer prepared in Example A in benzene and 26.0 g. (0.1 mole) of oleyl amine. Xylene was added and the solution heated to 140° C. to azeotrope the water with benzene. When no further water came over, the resultant product was isolated.

Infrared analysis showed the presence of the imide band and the absence of the anhydride band.

Example B.—Into a reaction flask fitted with a stirrer, condenser and thermometer was introduced 8.8 g. (0.05 mole) of allyl 3-sulfolanyl ether, 9.8 g. (0.1 mole) of maleic anhydride, 12.15 g. (0.05 mole) of cracked wax-1-monoolefin in the range of 15 to 20 carbon atoms and 30.75 g. of benzene. The mixture was stirred at 140° F. and 1 g. (0.004 mole) of benzoyl peroxide in a minimum of benzene added. The solution was heated to and maintained at 185° F. for a period of 12 hours in a nitrogen atmosphere.

Example II.—To the benzene solution prepared above was added 32.4 g. (0.1 mole) of N-aminopropyl oleylamine, followed by the addition of 200 ml. of xylene. The mixture was heated to azeotrope off the benzene and water and 1 equivalent of water was obtained. The reaction was then stopped.

Infrared analysis of the final product showed the desired imide band.

The novel compositions of this invention find use, particularly with compression ignition engines, e.g., diesel engines. The compositions are readily compatible with a variety of fuels and may be prepared as concentrates or at concentrations to be used directly in the engine. As concentrates, concentrations in the range of 25 to 75% by weight find use, while in the engine, the additive concentration will be in the range from about 10 to 2,000 p.p.m., more usually in the range of about 25 to 250 p.p.m.

The base fuel which may be used, in accordance with the invention, may be a straight run or a cracked petroleum distillate; or a residual fuel; or it may be a fuel derived from shale; or one produced synthetically, for instance, by the Fischer-Tropsch process. It may also be a mixture of two or more of the aforementioned fuels. The base fuels used boil in the range from about 325° to 750° F. In other words, they are suitable for use in engines of the diesel type, and the like, frequently referred to as fuel oils.

In fuels containing naphthenic acids, the basic amines nitrogen of the polymeric compositions may form ammonium naphthenate salts. These salts are effective detergents and the formation of the naphthenate salts does not significantly affect the detergency of the compositions of this invention.

In order to demonstrate the excellent dispersancy of the compositions of this invention, the exemplary compositions were tested under two generally accepted tests which determine the acceptability of a composition as a dispersant.

An accelerated stability test comprises heating a sample fuel for 90 minutes at 300° F., cooling at ambient temperatures for 90 minutes, and then filtering through a Whatman No. 1 filter paper. The appearance of the deposits on the filter is rated by a reflectometer on a rating scale of 100% reflectance for a new white filter and 0% reflectance for a completely black filter.

A second stability test was carried out by heating the fuel for 20 hours at 200° F. The fuel was then cooled at ambient temperature for 24 hours and filtered through a tared 5-micron pore size Millipore membrane filter. The filter is then weighed and the results are shown as parts per million of filter residue.

The fuel used was a 70% catalytically cracked light cycle oil plus 30% vacuum top-cut straight run. The following table indicates the results.

TABLE

| Additive | Conc., p.p.m. | 90 min. 300° F., percent reflectance | 20 hrs, 200° F., p.p.m. |
|---|---|---|---|
| Ex. I | 50 | 59 | 4 |
|  | 100 | 67 | 3 |
| Ex. II | 50 | 79 | 2 |
|  | 100 | 84 | 0 |
| Base Fuel |  | 52 | 22 |

It is evident from the above data that the dispersants of this invention prevent the formation of material which would interfere with engine filters, keeping any sludge dispersed in the fuel, preventing their deposition.

The compounds of this invention are also found to provide excellent rust inhibition and good water tolerance. Therefore, the compounds of this invention provide a variety of improvements to fuels with a minimum, or absence of deleterious effects.

Other additives may also be included in the fuel in combination with the present additives; such additives include antioxidants, metal deactivators and cetane improvers.

As will be evident to those skilled in the art, various modifications on this invention can be made or followed, in the light of the foregoing disclosure and discussion, without departing from the spirit or scope of the disclosure or from the scope of the following claims.

I claim:

1. A liquid petroleum fuel composition having in an amount sufficient to provide detergency and dispersancy, a terpolymer of a molecular weight in the range of about 2,000 to 15,000 having about 50 mole percent of an N-substituted maleimide, the substituents of the nitrogen being composed solely of carbon, hydrogen and nitrogen, having a total of from 3 to 60 carbon atoms and from 0 to 5 amine nitrogen atoms, from 20 to 35 mole percent of an aliphatic 1-olefin of from 8 to 30 carbon atoms and the remainder a 1-olefin of from 5 to 12 carbon atoms having from 0 to 1 ethereal oxygen and a sulfonyl group bonded to a carbon at least $\beta$ to the olefinic carbon.

2. A fuel composition according to claim 1, wherein said fuel is a fuel oil.

3. A fuel composition according to claim 1, wherein the 1-olefin having the sulfonyl group of said terpolymer is of the formula:

$$CH_2=CH(CH_2)_n(O)_mY$$

wherein $m$ is an integer of from 0 to 1, $n$ is an integer of from 1 to 2, and Y is a sulfonyl interrupted carbon chain of from 2 to 8 carbon atoms.

4. A fuel composition according to claim 1, wherein the 1-olefin having the sulfonyl group of said terpolymer is of the formula:

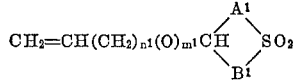

wherein $m^1$ is an integer of from 0 to 1, $n^1$ is an integer of from 1 to 2, $A^1$ and $B^1$ are a bond or alkylene, at least one of $A^1$ and $B^1$ being alkylene, the total number of annular carbon atoms being in the range of 4 to 5, and the sum of the carbon atoms of $A^1$ and $B^1$ being in the range of 3 to 7.

References Cited

UNITED STATES PATENTS 3,051,562   8/1962   Gee et al. _____ 260—78.5

DANIEL E. WYMAN, Primary Examiner

Y. H. SMITH, Assistant Examiner

U.S. Cl. X.R.

44—62